Sept. 17, 1929.　　F. L. HAUSHALTER　　1,728,545
LINEMAN'S BLANKET
Filed Feb. 14, 1924
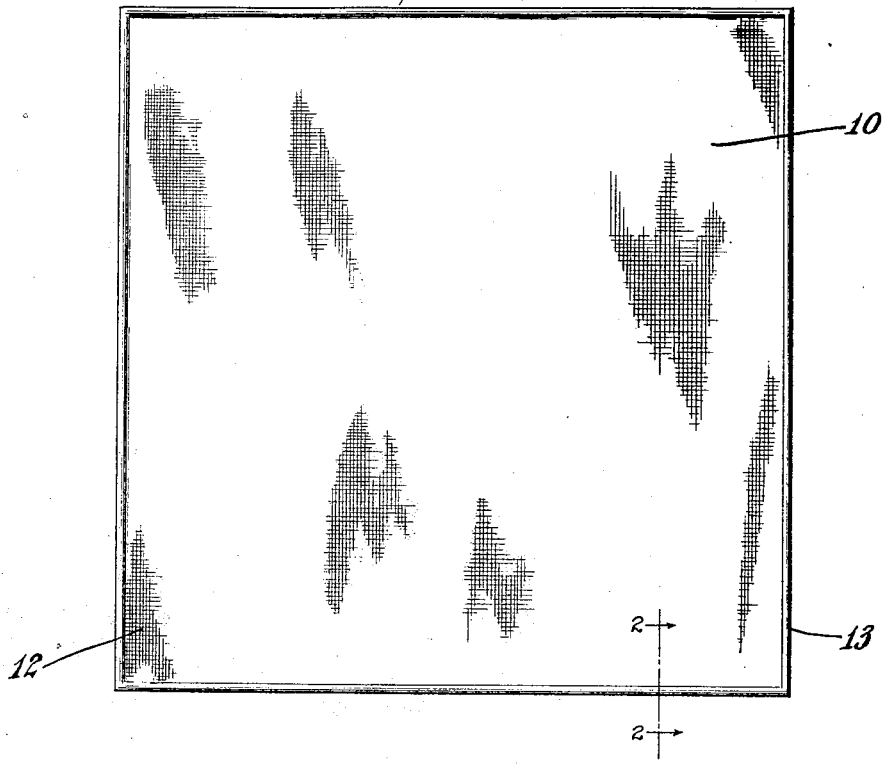
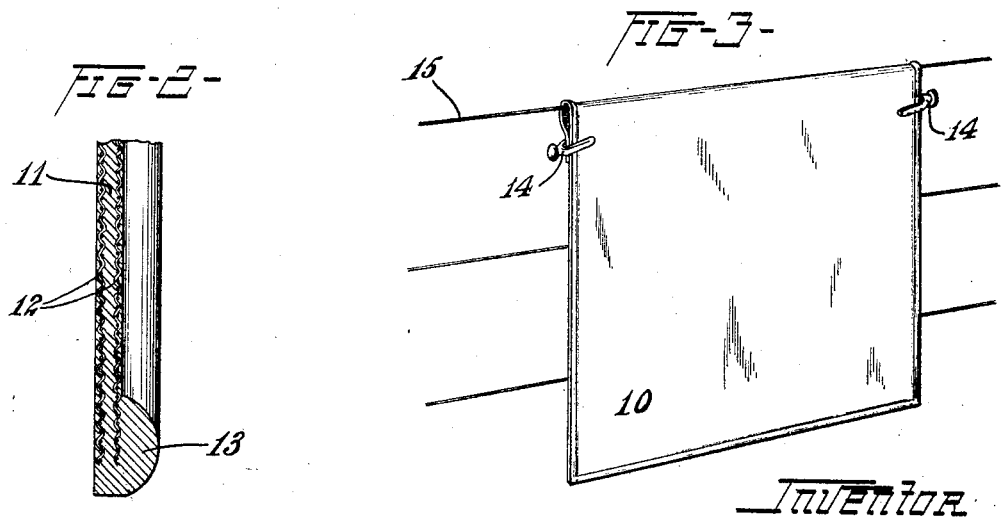
Inventor
Fred L. Haushalter.
By Robert M. Pierson
Atty.

Patented Sept. 17, 1929

1,728,545

UNITED STATES PATENT OFFICE

FRED L. HAUSHALTER, OF AKRON, OHIO, ASSIGNOR TO THE B. F. GOODRICH COMPANY, OF NEW YORK, N. Y., A CORPORATION OF NEW YORK

LINEMAN'S BLANKET

Application filed February 14, 1924. Serial No. 692,736.

This invention relates to electrical insulations and more particularly to sheet insulations, such as linemen's blankets, for the protection of workmen from conductors carrying high-voltage electrical currents.

Heretofore linemen's blankets have comprised vulcanized, sheet rubber so compounded as to withstand dielectric stress and reinforced by a sheet of fabric embedded therein to prevent substantial elongation and consequent thinning of the rubber sheet such as would reduce its insulating power, but it has been found that deterioration of the same in use has been very rapid. As such deterioration may take place without being easily perceptible to the eye, it may result in great danger to the workman before he discovers it. I have found that the deterioration is especially rapid in regions of the rubber which are under tension, as on the outer surface of a lineman's blanket hung upon a wire, where the flexure of the blanket over the wire put its outer region under tension. Thus the blanket is caused to check and crack at the very region where its dielectric effect is most needed. I also have found that this effect upon the tensioned rubber is related to the formation of corona by the high voltage.

As a result of investigations and experimentation I am convinced that the deterioration of the tensioned rubber is due to the bombardment of the rubber surface by the particles of ionized air forming the corona, which, in effect, mechanically cut the tensioned rubber, the effect being analogous to drawing a knife across a tensioned piece of rubber as contrasted with similarly applying a knife to rubber under compression, but whether it is due to this or to the action, in a chemical sense, of ozone formed in the corona, or to both, I am the first, so far as I am aware, to provide an effective remedy.

The chief object of my invention is to provide an improved insulation, suitable for use, for example, as a lineman's blanket or shield, and more particularly to provide a blanket or shield of reinforced rubber adapted to resist the deteriorating effect of high tension conductors or of corona created thereby, and I attain this and lesser objects which will be apparent by providing upon the blanket or the like a protective covering of a material adapted to receive the impact of the ions without being disintegrated thereby. I have discovered that, among other materials adapted for the purpose, close woven fabric, such as canvas, serves the purpose very well when placed at the outer surface of the blanket, while acting also as a reinforcement.

Of the accompanying drawings:

Fig. 1 is a plan of a lineman's blanket embodying my invention.

Fig. 2 is a section on line 2—2 of Fig. 1.

Fig. 3 is a perspective view of the blanket suspended upon a conductor.

Referring to the drawings, the blanket, 10, comprises an inner body or sheet of rubber 11, sheets of frictioned fabric 12, 12, secured upon the faces of the sheet 10, preferably by vulcanization, and a marginal bead 13 of rubber thereon, preferably made integral with the central body 11 and the rubber of the frictioned fabric 12 by vulcanization.

In the preferred method of manufacture, the sheet 11 is cut from calendered stock, the sheets 12, cut from a strip of frictioned fabric, are applied thereto, and strips of tubed stock are applied to form the marginal bead 13. The structure thus formed is then vulcanized in a mold, under heat and pressure. In Fig. 3 the finished blanket, 10 is secured in the usual manner, by clothespins 14, 14, to a conductor 15.

The blanket as described not only withstands the conditions of use above described throughout a greater period of service than blankets heretofore used, but provides this advantage without greatly increased cost of manufacture and without other reinforcement than the surface layers of fabric. The protection against the electrical disintegration of the rubber, when the surface member is of fabric or similar stretch-resisting material, is probably due in part to the fact that such member causes the rubber to flex by compression of its inner side rather than by elongation of its outer side, so that the tensile stresses in the rubber are not such as to promote the disintegrating effect, the latter being dependent upon the condition of tension or elongation. Deterioration of the rubber by oxidation and "blooming" of the sulfur therein is also retarded by the surface coating.

For economy of material in cutting the cloth I prefer to have the threads of the latter run parallel with the sides of the blanket, as shown, and I find that this does not excessively reduce the flexibility of the latter, but I do not wholly limit my claims to this arrangement, nor in fact to the use of fabric for the protective coating. Various other coatings, as, for example, a flexible film of cellulose acetate, or the like, are effective to protect the surface of the rubber against the electrical effect above described, but I prefer to use the fabric because of its reinforcing effect. The fabric or other coating is preferably applied to both sides of the rubber body, so that the blanket may be used with either side out and its life thus increased and also to avoid the need of extensive manipulation in shifting it from one conductor to another.

Modifications other than those described herein may be resorted to without departing from the scope of my invention as claimed.

I claim:

1. A protective blanket for conductors of high tension electric currents comprising a relatively thick sheet of a rubber composition possessing a high dielectric strength of an order sufficient to inhibit passage therethrough of a high tension corona-emitting electric current, and a closely woven fabric sheet secured to and covering a surface of said rubber sheet.

2. A protective blanket for conductors of high tension electric currents comprising a relatively thick sheet of a rubber composition possessing a high dielectric strength of an order sufficient to inhibit passage therethrough of a high tension corona-emitting electric current, and a closely woven fabric sheet secured to and covering each surface of said rubber sheet.

3. The method of preserving the dielectric strength of the rubber of a sheet rubber blanket for high tension conductors which comprises covering the surface of said rubber sheet exposed to the corona emissions from said conductor with a closely woven fabric.

In witness whereof I have hereunto set my hand this 7th day of February, 1924.

FRED L. HAUSHALTER.